United States Patent
Xing et al.

(10) Patent No.: US 11,866,368 B2
(45) Date of Patent: Jan. 9, 2024

(54) UNCALCINED GEOPOLYMER-BASED REFRACTORY MATERIAL AND METHOD FOR ITS PREPARATION

(71) Applicant: Shenzhen University, Guangdong (CN)

(72) Inventors: Feng Xing, Guangdong (CN); Yuan Fang, Guangdong (CN); Aoxuan Wang, Guangdong (CN)

(73) Assignee: Shenzhen University, Shenzhen (CN)

( * ) Notice: Subject to any disclaimer, the term of this patent is extended or adjusted under 35 U.S.C. 154(b) by 34 days.

(21) Appl. No.: 17/474,908

(22) Filed: Sep. 14, 2021

(65) Prior Publication Data
US 2022/0081363 A1 Mar. 17, 2022

(30) Foreign Application Priority Data
Sep. 14, 2020 (CN) .................... 202010959049.5

(51) Int. Cl.
C04B 12/00 (2006.01)
C04B 28/00 (2006.01)
C04B 14/32 (2006.01)
C04B 14/38 (2006.01)

(52) U.S. Cl.
CPC .......... *C04B 28/006* (2013.01); *C04B 14/324* (2013.01); *C04B 14/383* (2013.01)

(58) Field of Classification Search
CPC ........................... C04B 12/005; C04B 14/4693
See application file for complete search history.

(56) References Cited

U.S. PATENT DOCUMENTS

| 2012/0152153 A1* | 6/2012 | Gong ............. C04B 28/006 106/816 |
| 2016/0304402 A1* | 10/2016 | Kriven ............ C04B 33/36 |
| 2020/0031717 A1* | 1/2020 | Gong ............. C04B 28/021 |

FOREIGN PATENT DOCUMENTS

| CN | 107098668 A | 8/2017 |
| CN | 110240490 A | 9/2019 |
| CN | 111423164 A | 7/2020 |
| WO | WO-2020097690 A1 * | 5/2020 ........... C04B 12/005 |

OTHER PUBLICATIONS

Yip et al., Carbonate mineral addition to metakaolin-based geopolymers, Cement & Concrete Composites 30 (2008) 979-985 (Year: 2008).*
Zhang et al, Using fly ash to partially substitute metakaolin in geopolymer synthesis, Applied Clay Science, vols. 88-89, Feb. 2014, pp. 194-201 (Year: 2014).*
Du et al., Microstructure and compressive properties of silicon carbide reinforced geopolymer, Composites Part B: Engineering vol. 105, Nov. 15, 2016, pp. 93-100 (Year: 2016).*

(Continued)

*Primary Examiner* — Hoa (Holly) Le
(74) *Attorney, Agent, or Firm* — Morse, Barnes-Brown & Pendleton, P.C.; Martin Z. Zhang, Esq.

(57) ABSTRACT

An uncalcined geopolymer-based refractory material is provided, comprising a matrix of a geopolymer obtainable by polymerization of a mixture consisting of mineral powder, fly ash, and metakaolin; and SiC whiskers embedded in the geopolymer matrix. The material has excellent mechanical properties and high resistance to high temperatures and exhibits a ductile fracture mechanism instead of a brittle fracture mechanism.

20 Claims, 1 Drawing Sheet

(56) References Cited

OTHER PUBLICATIONS

Fang et al., Property evolution of geopolymer composites with SiC whiskers loaded with BN coating at elevated temperatures, Construction and Building Materials, vol. 309, Nov. 22, 2021, 125130 (Year: 2021).*

Taborda-Barraza et al., Thermal-mechanical properties of metakaolin-based geopolymer containing silicon carbide microwhiskers, Cement and Concrete Composites, vol. 123, Oct. 2021, 104168 (Year: 2021).*

Zhang et al, Using fly ash to partially substitute metakaolin in geopolymer synthesis, Applied Clay Science 88-89 (2014) 194-201 (Year: 2014).*

Vogt et al., ReactivityandMicrostructureofMetakaolin BasedGeopolymers:EffectofFlyAshand Liquid/SolidContents, Materials 2019, 12, 3485; doi:10.3390/ma12213485 (Year: 2019).*

English Translation of First Office Action issued in Chinese Application No. 202010959049.5.

English Translation of Second Office Action issued in Chinese Application No. 202010959049.5.

\* cited by examiner

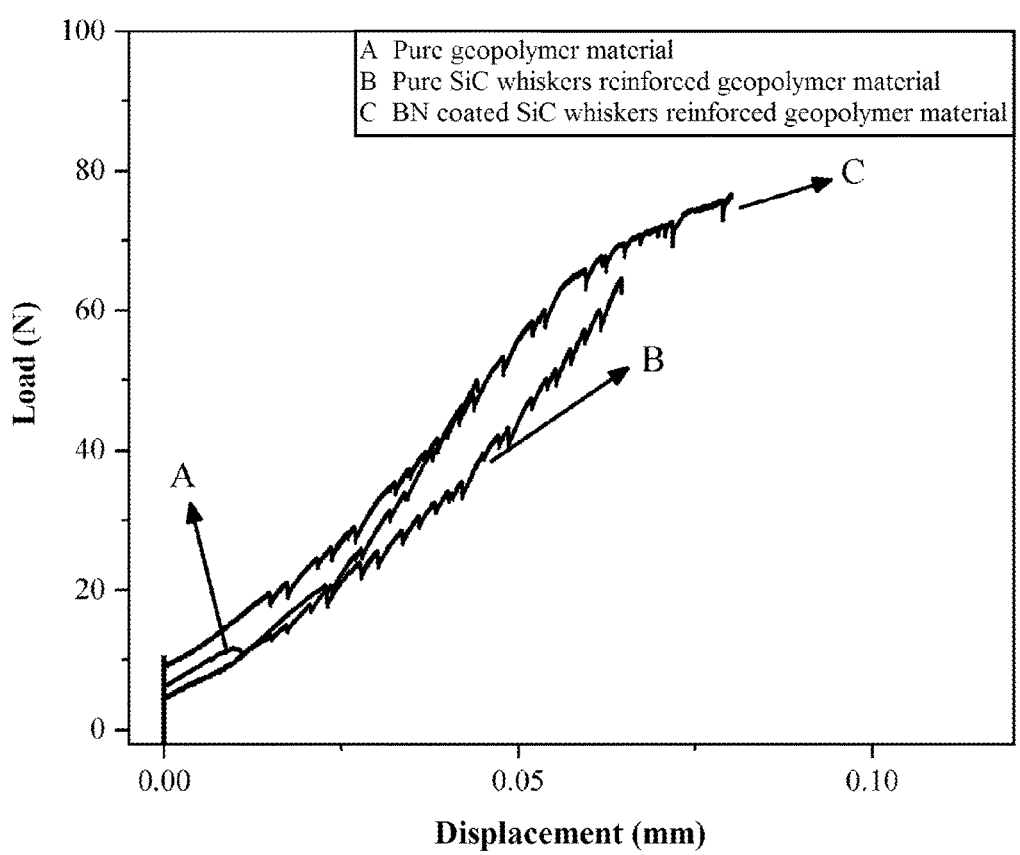

UNCALCINED GEOPOLYMER-BASED REFRACTORY MATERIAL AND METHOD FOR ITS PREPARATION

CROSS REFERENCE TO RELATED APPLICATION

This patent application claims the benefit and priority of Chinese Patent Application No. 202010959049.5, filed on Sep. 14, 2020, the disclosure of which is incorporated by reference herein in its entirety as part of the present application.

TECHNICAL FIELD

The present disclosure is generally related to the field of building materials, and in particular to an uncalcined geopolymer-based refractory material and a method for its preparation.

BACKGROUND ART

Cement production process produces a large amount of carbon dioxide ($CO_2$). This goes against the requirement in modern society for sustainable development. There is thus a desire for new building materials. Geopolymers are inorganic polymers with a three-dimensional network structure mainly composed of tetrahedrally-coordinated $AlO_4$ and $SiO_4$ units, and have excellent mechanical properties and high resistance to high temperatures and fire as well as acids and alkalis. Geopolymers are often synthesized via alkali activation technology, which is free from a so-called "two grinding and one calcination" process required by the manufacturing of cement and thus has reduced energy consumption, resulting in lower $CO_2$ emission. Also, they can be made from various industrial waste materials (rich in active silicon and aluminum), which avoids the problem that these waste materials would occupy the finite land resources. However, geopolymers are brittle in nature, and such drawback becomes more conspicuous when they are exposed to a high temperature environment. In that instance, there would be no chance for the geopolymers to fully exhibit their excellent heat resistance.

SUMMARY

Accordingly, the present disclosure is directed to an uncalcined geopolymer-based refractory material exhibiting a ductile fracture mechanism instead of a brittle fracture mechanism and having excellent mechanical properties and heat resistance, and to a method for its preparation.

In one aspect, the disclosure provides an uncalcined geopolymer-based refractory material, comprising a matrix of a geopolymer obtainable by polymerization of a mixture consisting of mineral powder, fly ash, and metakaolin; and silicon carbide (SiC) whiskers embedded in the geopolymer matrix.

In an embodiment, the SiC whiskers are present in the geopolymer matrix in an amount of 0.8 to 1.2 wt. %.

In an embodiment, the SiC whiskers are composed of pure SiC only or boron nitride (BN) coated SiC. In a further embodiment, the BN coated SiC whiskers have a 50 to 250 nm thick BN coating.

In an embodiment, the SiC whiskers have a diameter of 0.1 to 2.5 μm and a length of 2 to 50 μm.

In an embodiment, the mineral powder is high-calcium mineral powder, and the fly ash is Class F fly ash. In an embodiment, a mass ratio of mineral powder:fly ash:metakaolin is (35-45):(25-35):(25-35).

In another aspect, the present disclosure provides a method for preparing the uncalcined geopolymer-based refractory material, the method comprising:
(a) mixing the mineral powder, the fly ash, the metakaolin, and the SiC whiskers by ball milling to form a milled material;
(b) mixing the milled material with a sodium water glass solution (sodium silicate solution) and water to form a slurry; and
(c) curing the slurry to obtain the uncalcined geopolymer-based refractory material.

In some embodiments, the method further comprises: before step (a), subjecting the SiC whiskers to a dispersion treatment by mixing the SiC whiskers with a dispersant solution by ultrasonic vibration, followed by drying. In a particular embodiment, the dispersant solution is a 95 wt. % aqueous solution of 2-amino-2-methyl-1-propanol (AMP-95).

In an embodiment of the method of the disclosure, in step (a), the mineral powder, the fly ash, the metakaolin, and the SiC whiskers are ball milled together with zirconium oxide beads having a diameter of 5 mm at a rotation speed of 150 rpm for 25 min.

In an embodiment of the method, the sodium water glass used in step (b) has an $SiO_2/Na_2O$ modulus in the range from 1.5 to 3.5. In an embodiment, in step (b), a ratio of a mass of sodium silicate to a total mass of the mineral powder, the fly ash, and the metakaolin is 0.15:1, and a ratio of a total mass of the water used and the water in the sodium water glass solution to a total mass of the mineral powder, the fly ash, and the metakaolin is 0.4:1.

In an embodiment, in step (c), the slurry obtained in step (b) is cured by placing it in a mold inside a curing chamber for 24 h at 95±5% relative humidity and 23±0.5° C. and then maintaining it inside the curing chamber after removal from the mold for 7 days under the same temperature and humidity conditions.

As described above, one aspect of the present disclosure provides an uncalcined geopolymer-based refractory material (also referred to herein as a composite material or composite), comprising a matrix of a geopolymer obtainable by polymerization of a mixture consisting of mineral powder, fly ash, and metakaolin; and silicon carbide (SiC) whiskers embedded in the geopolymer matrix. It has been found that the incorporation of the SiC whiskers can increase the fracture toughness of the material by exhausting more fracture energy via mechanisms including whisker debonding, whisker pull-out and crack deflection. The present composite material not only exhibits all of the advantages of the geopolymer matrix material, but is also toughened by the SiC whiskers such that the material is hardly brittle-fractured even at high temperatures (at which pure geopolymer materials that are not toughened by SiC whiskers tend to undergo brittle fracture due to excessively high vapour pressure inside pores of these materials exceeding the maximum pressure limit that can be withstood by the pore walls) since the SiC whiskers can exhibit good performances at high temperatures. Accordingly, the present composite material can have an improved resistance to high temperatures and fire. The present material can have excellent mechanical properties and resistance to high temperatures and exhibit a ductile fracture mechanism instead of a brittle fracture mechanism. In addition, the geopolymer component of the composite is obtainable from mineral powder, fly ash, and metakaolin, each of which is low in cost.

Another aspect of the present disclosure provides a method for preparing the uncalcined geopolymer-based refractory material by using alkali-activation technology. The method is free from the "two grinding and one calcination" as mentioned in the background, and thus has reduced energy consumption. Moreover, this method is simple and easy to implement, and can be applied on an industrial scale.

BRIEF DESCRIPTION OF THE DRAWINGS

FIG. 1 is a graph of the load displacement curves of a four point bend test of the materials prepared in Examples 1 and 2 and in Comparative Example.

DETAILED DESCRIPTION

In one aspect, the present disclosure provides an uncalcined geopolymer-based refractory material or a composite material, comprising a matrix of a geopolymer obtainable by polymerization of a mixture consisting of mineral powder, fly ash, and metakaolin; and silicon carbide (SiC) whiskers embedded in the geopolymer matrix.

The composite material comprises a geopolymer matrix. The geopolymer is obtainable by polymerization of a mixture consisting of mineral powder, fly ash, and metakaolin. In an embodiment, the mineral power is high-calcium mineral powder having a calcium content, present as calcium oxide, of greater than or equal to 40 wt. %. In an embodiment, the fly ash is Class F fly ash. In an embodiment, a mass ratio of mineral powder:fly ash:metakaolin is (35-45):(25-35):(25-35), preferably 4:3:3.

The composite material of the present disclosure further comprises SiC whiskers embedded in the geopolymer matrix.

In an embodiment, the SiC whiskers are present in the geopolymer matrix in an amount of 0.8 to 1.2 wt. %, preferably 1 wt. %. In a particular embodiment, the SiC whiskers are composed of pure SiC only or boron nitride (BN) coated SiC. In a further embodiment, the BN coated SiC whiskers have a 50 to 250 nm thick, preferably 150 to 200 nm thick, BN coating. In an embodiment, the SiC whiskers have a diameter of 0.1 to 2.5 μm, preferably 0.5 to 2 μm, and a length of 2 to 50 μm, preferably 10 to 40 μm.

In some embodiments, the BN coated SiC whiskers can be obtained by a process comprising:
(i) mixing and heating boric acid, urea, acrylamide (AM), N,N'-methylene bisacrylamide (MBA), water, ethanol, and ammonium persulphate to form a solution;
(ii) immersing pure SiC whiskers in the solution, followed by drying and sintering.

According to these embodiments, in order to obtain the BN coated SiC whiskers, boric acid, urea, AM, MBA, water, ethanol, and ammonium persulphate are first mixed together in proportion and heated to form a solution. A preferred mass ratio of the boric acid to the urea is 1:1.5. A preferred mass ratio of AM:MBA:boric acid is 25:1:100. A preferred mass ratio of the water to the boric acid is 2.5:1. A preferred mass ratio of the ammonium persulphate to the boric acid is 3:100. The ethanol is preferably anhydrous ethanol. A preferred mass ratio of the ethanol to the boric acid is 5:1 (unit: mL/g). The ethanol is added to aid solubility.

The step of mixing boric acid, urea, AM, MBA, water, ethanol, and ammonium persulphate may be performed by adding boric acid, urea, AM, and MBA to water and mixing to form a first solution; adding ethanol to the first solution and mixing to form a second solution; adding ammonium persulphate to the second solution and mixing to form the solution in step (i). The manner of mixing is not particularly limited and may be accomplished in any conventional fashion, such as, for example, stirring.

The heating in step (i) is preferably carried out at 60° C. The heating may be carried out for any time period sufficient to ensure complete dissolution. The heating temperature is preferably kept constant by a thermostatically regulated water bath.

Pure SiC whiskers are then immersed in the solution in step (i) and then dried and sintered in order to obtain the BN coated SiC whiskers. The immersion procedure in the solution may be repeated twice, 10 min each. The drying temperature and time period are not particularly limited as long as the immersed SiC whiskers can be dried to constant weight.

The sintering may be carried out at 850° C. in a tube furnace for 2 h. During the sintering process, the boric acid and the urea are reacted with each other in the presence of cross-linking agents, i.e., AM and MBA, and of an initiator, i.e., ammonium persulphate, to form BN, with which the pure SiC whiskers are coated. The BN coating enables an improvement in the resistance of the whiskers to oxidation, reducing surface damage that can occur during oxidation. Furthermore, the BN coating can compensate for the thermal expansion coefficient mismatch between the SiC whiskers and the geopolymer matrix, and reduce the tangential stress at interface surfaces at high temperatures, resulting in enhanced debonding and pull-out behaviors of the whiskers in the composite material and thus better ductility and fracture resistance of the material.

It has also been found that the incorporation of SiC whiskers into the geopolymer matrix can increase the fracture toughness of the composite by exhausting more fracture energy via whisker debonding, whisker pull-out and crack deflection. The present composite material not only exhibits all of the advantages of the geopolymer matrix material, but is also toughened by the SiC whiskers such that the material is hardly brittle-fractured even at high temperatures (at which pure geopolymer materials that are not toughened by SiC whiskers tend to undergo brittle fracture) since the SiC whiskers can exhibit good performances at high temperatures. Accordingly, the composite material can have an improved resistance to high temperatures over the geopolymer. The present material can have excellent mechanical properties and high resistance to high temperatures and exhibit a ductile fracture mechanism instead of a brittle fracture mechanism. In addition, the geopolymer component of the composite is obtainable from mineral powder, fly ash, and metakaolin, each of which is low in cost.

In another aspect, the present disclosure provides a method for preparing the uncalcined geopolymer-based refractory material, the method comprising:
(a) mixing the mineral powder, the fly ash, the metakaolin, and the SiC whiskers by ball milling to form a milled material;
(b) mixing the milled material with a sodium water glass solution (sodium silicate solution) and water to form a slurry; and
(c) curing the slurry to obtain the uncalcined geopolymer-based refractory material.

The mineral powder, the fly ash, the metakaolin, and the SiC whiskers are first mixed by ball milling to form a milled material. In an embodiment, the mineral powder is high-calcium mineral powder. In an embodiment, the fly ash is Class F fly ash. In an embodiment, the mineral powder, the fly ash, and the metakaolin are mixed in a mixing ratio (mass ratio) of (35-45):(25-35):(25-35), preferably 4:3:3. The source of any of the mineral powder, the fly ash, the metakaolin is not particularly limited. Preferably, however, the mineral powder, the fly ash, and the metakaolin are derived from waste industrial materials. This advantageously may achieve reuse of these waste materials and avoid the problem that they would occupy the finite land resources. In an embodiment, the SiC whiskers are used in an amount of 0.8 to 1.2 wt. %, preferably 1 wt. %, with respect to the total use amount of the mineral powder, the fly ash, and the metakaolin.

In some embodiments, the method further comprises: before step (a), subjecting the SiC whiskers to a dispersion treatment by mixing the SiC whiskers with a dispersant solution by ultrasonic vibration, followed by drying of the mixture. In a particular embodiment, the dispersant solution is a 95 wt. % aqueous solution of 2-amino-2-methyl-1-propanol (AMP-95).

A mass ratio of the dispersant solution to the SiC whiskers may be 1:10. The ultrasonic vibration may be carried out in any suitable manner, and the ultrasonic vibration conditions are not particular limited as long as the tangling between the whiskers can be broken. The temperature and period of time for drying the mixture of the SiC whiskers and the dispersant solution are not particularly limited as long as they can be dried to constant weight. During the drying of the mixture, the water and AMP-95 contents in the mixture are evaporated, leaving the dispersed SiC whiskers.

In an embodiment, in step (a), the mineral powder, the fly ash, the metakaolin, and the SiC whiskers are ball milled together with zirconium oxide beads having a diameter of 5 mm at a rotation speed of 150 rpm for 25 min, to form a milled material. Ball milling can ensure that the mixture is uniformly mixed and dispersed.

After the milled material is formed, it is mixed with a sodium water glass solution and water to form a slurry. In an embodiment, the sodium water glass has an $SiO_2/Na_2O$ modulus in the range from 1.5 to 3.5, preferably 2. In an embodiment, the sodium water glass solution has a water content of 60 wt. %. In an embodiment, a ratio of a mass of sodium silicate in the sodium water glass solution to a total mass of the mineral powder, the fly ash, and the metakaolin is 0.15:1. In an embodiment, a ratio of a total mass of the water used and the water in the sodium water glass solution to a total mass of the mineral powder, the fly ash, and the metakaolin is 0.4:1. The water used in this step may be deionized water. The milled material may be mixed with the sodium water glass solution and the water by stirring at high speed, preferably at 100 to 130 rpm. The stirring may be carried out for any time sufficient to ensure uniform mixing.

After the slurry is obtained, it is cured so as to obtain the uncalcined geopolymer-based refractory material. In an embodiment, the slurry is cured by placing it in a mold inside a curing chamber for 24 h at 95±5% relative humidity and 23±0.5° C. and then maintaining it inside the curing chamber after removal from the mold for 7 days under the same temperature and humidity conditions.

Therefore, as described above, the present disclosure also provides a method for preparing the uncalcined geopolymer-based refractory material by using alkali-activation technology. The method is free from the "two grinding and one calcination" as mentioned in the background, and thus has reduced energy consumption. Moreover, this method is simple and easy to implement, and can be applied on an industrial scale.

The disclosure will now be further illustrated by the following examples which are not intended to limit the scope of the disclosure in any wall.

Example 1

5 g of pure SiC whiskers with a diameter of 0.1 to 2.5 µm and a length of 2 to 50 µm were added to a 95 wt. % aqueous solution of AMP-95 and dispersed by using an ultrasonic washing machine, followed by drying.

5 g of the above obtained SiC whiskers, 200 g of high-calcium mineral powder, 150 g of Class F fly ash, and 150 g of metakaolin were mixed and dispersed by a ball mill using zirconium oxide beads having a diameter of 5 mm at a rotation speed of 150 rpm for 25 min, to give a milled material.

To a concrete mixer, the milled material, 187.5 g of a sodium water glass solution (2 modulus; 60 wt. % water content), and 87.5 g of deionized water were added and stirred at a high speed of 120 rpm for 3 min to form a slurry.

The slurry was poured into a mold and then placed into a concrete curing box for curing at 95±5% relative humidity and 23±0.5° C. for 24 h and then for 7 days in the curing box at the same conditions after removal from the mold. Finally, a SiC whiskers reinforced geopolymer material (i.e., an uncalcined geopolymer-based refractory material) was obtained.

Example 2

4 g of boric acid, 6 g of urea, 1 g of AM, and 0.04 g of MBA were added to 10 mL of deionized water in a beaker. 20 mL of anhydrous ethanol and then 0.12 g of ammonium persulphate were added thereto. Then, the beaker was placed in a water bath (60° C.) and stirring was performed until all solids were dissolved. A amount of pure SiC whiskers (having a diameter of 0.1 to 2.5 µm and a length of 2 to 50 µm) were immersed in the solution. The immersion operation was carried out twice for 10 min each. Then, filtration and drying were performed. Thereafter, the resulting whiskers were kept at 850° C. in a tube furnace for 2 h so that the SiC whiskers were coated with a 150 nm thick BN coating.

5 g of the BN coated SiC whiskers were weighed, added to 0.5 g of a 95 wt. % aqueous solution of AMP-95 and dispersed by using an ultrasonic washing machine, followed by drying.

5 g of the above obtained BN coated SiC whiskers, 200 g of high-calcium mineral powder, 150 g of Class F fly ash, and 150 g of metakaolin were mixed and dispersed by a ball mill using zirconium oxide beads having a diameter of 5 mm at a rotation speed of 150 rpm for 25 min, to give a milled material.

To a concrete mixer, the milled material, 187.5 g of a sodium water glass solution (2 modulus; 60 wt. % water content), and 87.5 g of deionized water were added and stirred at a high speed of 120 rpm for 3 min to form a slurry.

The slurry was poured into a mold and then placed into a concrete curing box for curing at 95±5% relative humidity and 23±0.5° C. for 24 h and then for 7 days in the curing box at the same conditions after removal from the mold. Finally, a BN coated SiC whiskers reinforced geopolymer material (i.e., uncalcined geopolymer-based refractory material) was obtained.

Comparative Example 200 g of high-calcium mineral powder, 150 g of Class F fly ash, and 150 g of metakaolin were mixed and dispersed by a ball mill using zirconium oxide beads having a diameter of 5 mm at a rotation speed of 150 rpm for 25 min, to give a milled material.

To a concrete mixer, the milled material, 187.5 g of a sodium water glass solution (2 modulus; 60 wt. % water content), and 87.5 g of deionized water were added and stirred at a high speed of 120 rpm for 3 min to form a slurry.

The slurry was poured into a mold and then placed into a concrete curing box for curing at 95±5% relative humidity and 23±0.5° C. for 24 h and then for 7 days in the curing box at the same conditions after removal from the mold. Finally, a pure geopolymer material was obtained.

The materials prepared in Examples 1 and 2 and in Comparative Example were each made into a rectangular bar with dimensions of 5 mm×5 mm×29 mm and tested for their bending strength at different temperatures by performing a four point bending test using a span length of 17 mm. The test results are shown in Table 1 below.

TABLE 1

| Temperature | Bending Strength/MPa | | |
|---|---|---|---|
| | Comp Ex. | Ex. 1 | Ex. 2 |
| R.T. | 7.49 | 8.14 | 9.76 |
| 600° C. | 8.05 | 10.74 | 11.45 |
| 900° C. | 0 (indicating severe cracking) | 6.91 | 9.05 |

From Table 1 it is evident that the composite materials prepared in Examples 1 and 2 exhibited better mechanical properties and resistance to high temperatures than the pure geopolymer material in Comparative Example.

FIG. 1 is a graph of the load displacement curves of the four point bend test of the materials prepared in Examples 1 and 2 and in Comparative Example, where A, B, and C represent the curve of Examples 1 and 2 and Comparative Example, respectively. From this FIGURE, it can be found that the pure geopolymer material prepared in Comparative Example exhibited a typical brittle failure, while the SiC whiskers reinforced geopolymer material prepared in Example 1 exhibited a ductile failure, and thus had an improved fracture toughness over the pure geopolymer material. Further, the BN coated SiC whiskers reinforced geopolymer material prepared in Example 2 exhibited a further improved mechanical strength and fracture toughness over the material in Example 1.

In conclusion, the materials of the disclosure can exhibit a ductile failure instead of a brittle failure, and have excellent mechanical properties and high resistance to high temperatures.

The descriptions above are just preferred embodiments of the disclosure. Accordingly, those skilled in the art will recognize that various changes and modifications of the embodiments described herein can be made without departing from the scope and spirit of the disclosure.

What is claimed is:

1. An uncalcined geopolymer-based refractory material, comprising:
   a matrix of a geopolymer obtained by polymerization of a mixture consisting of mineral powder, fly ash, and metakaolin; and
   silicon carbide whiskers embedded in the geopolymer matrix, the silicon carbide whiskers being pure silicon carbide whiskers or boron nitride coated silicon carbide whiskers,
   wherein a mass ratio of the mineral powder to the fly ash to the metakaolin is in a range of (35-45):(25-35):(25-35).

2. The material of claim 1, wherein, the silicon carbide whiskers are present in the geopolymer matrix in an amount of 0.8 to 1.2 wt. %.

3. The material of claim 2, wherein, the silicon carbide whiskers have a diameter of 0.1 to 2.5 μm and a length of 2 to 50 μm.

4. The material of claim 3, wherein, the boron nitride coated silicon carbide whiskers have a 50 to 250 nm thick boron nitride coating.

5. The material of claim 1, wherein, the silicon carbide whiskers have a diameter of 0.1 to 2.5 μm and a length of 2 to 50 μm.

6. The material of claim 5, wherein, the boron nitride coated silicon carbide whiskers have a 50 to 250 nm thick boron nitride coating.

7. The material of claim 1, wherein, the mineral powder is high-calcium mineral powder and the fly ash is Class F fly ash.

8. A method for preparing the uncalcined geopolymer-based refractory material of claim 1, the method comprising steps of:
   (a) mixing the mineral powder, the fly ash, the metakaolin, and the silicon carbide whiskers by ball milling to form a milled material;
   (b) mixing the milled material with a sodium water glass solution and water to form a slurry; and
   (c) curing the slurry to obtain the uncalcined geopolymer-based refractory material.

9. The method of claim 8, further comprising: before the step (a), subjecting the silicon carbide whiskers to a dispersion treatment comprising:
   mixing the silicon carbide whiskers with a dispersant solution by ultrasonic vibration, followed by drying;
   wherein, the dispersant solution is a 95 wt. % aqueous solution of 2-amino-2-methyl-1-propanol.

10. The method of claim 8, wherein, in the step (a), the mineral powder, the fly ash, the metakaolin, and the SiC whiskers are ball milled together with zirconium oxide beads having a diameter of 5 mm at a rotation speed of 150 rpm for 25 min.

11. The method of claim 8, wherein, the sodium water glass used in the step (b) has an $SiO_2/Na_2O$ modulus in the range from 1.5 to 3.5, and wherein, a ratio of a mass of sodium silicate in the sodium water glass solution to a total mass of the mineral powder, the fly ash, and the metakaolin is 0.15:1, and a ratio of a total mass of the water used and the water in the sodium water glass solution to a total mass of the mineral powder, the fly ash, and the metakaolin is 0.4:1.

12. The method of claim 8, wherein, in the step (c), the slurry obtained in the step (b) is cured by placing it in a mold inside a curing chamber for 24 h at 95±5% relative humidity and 23±0.5° C. and then maintaining it inside the curing chamber after removal from the mold for 7 days under the same temperature and humidity conditions.

13. The method of claim 8, wherein, the silicon carbide whiskers are present in the geopolymer matrix in an amount of 0.8 to 1.2 wt. %.

14. The method of claim 13, wherein, the silicon carbide whiskers are composed of pure silicon carbide only or boron nitride coated silicon carbide, and have a diameter of 0.1 to 2.5 μm and a length of 2 to 50 μm.

15. The method of claim 14, wherein, the boron nitride coated silicon carbide whiskers have a 50 to 250 nm thick boron nitride coating.

16. The method of claim 13, further comprising: before the step (a), subjecting the silicon carbide whiskers to a dispersion treatment comprising:
mixing the silicon carbide whiskers with a dispersant solution by ultrasonic vibration, followed by drying;
wherein, the dispersant solution is a 95 wt % aqueous solution of 2-amino-2-methyl-1-propanol.

17. The method of claim 8, wherein, the silicon carbide whiskers are composed of pure silicon carbide only or boron nitride coated silicon carbide, and have a diameter of 0.1 to 2.5 μm and a length of 2 to 50 μm.

18. The method of claim 17, wherein, the boron nitride coated silicon carbide whiskers have a 50 to 250 nm thick boron nitride coating.

19. The method of claim 17, further comprising: before the step (a), subjecting the silicon carbide whiskers to a dispersion treatment comprising:
mixing the silicon carbide whiskers with a dispersant solution by ultrasonic vibration, followed by drying;
wherein, the dispersant solution is a 95 wt % aqueous solution of 2-amino-2-methyl-1-propanol.

20. The method of claim 8, wherein, the mineral powder is high-calcium mineral powder and the fly ash is Class F fly ash; and wherein a mass ratio of mineral powder:fly ash metakaolin is (35-45):(25-35):(25-35).

* * * * *